(No Model.)

P. R. GRAY, Jr.
STILL.

No. 437,193. Patented Sept. 30, 1890.

Witnesses
Geo. W. Breck.
C. E. Ashley

Inventor
Philander R. Gray Jr.
By his Attorneys
Baldwin Davidson & Wight

UNITED STATES PATENT OFFICE.

PHILANDER R. GRAY, JR., OF ELIZABETH, NEW JERSEY.

STILL.

SPECIFICATION forming part of Letters Patent No. 437,193, dated September 30, 1890.

Application filed November 13, 1889. Serial No. 330,168. (No model.)

*To all whom it may concern:*

Be it known that I, PHILANDER R. GRAY, Jr., a citizen of the United States, residing at Elizabeth, county of Union, and State of New Jersey, have invented certain new and useful Improvements in Stills, of which the following is a specification.

My invention more especially appertains to that class of refrigerating apparatus operating under the evaporation and absorption method employing aqua-ammonia or an equivalent cooling agent; and it is especially designed for use in connection with apparatus similar to that shown in Letters Patent No. 406,345, granted to Philander R. Gray and myself July 2, 1889.

The object of my invention is to secure a simple and efficient apparatus the parts of which may readily be assembled, removed, and replaced. These ends I attain by certain new constructions, combination, and organization of instrumentalities hereinafter specified.

Figure 1:
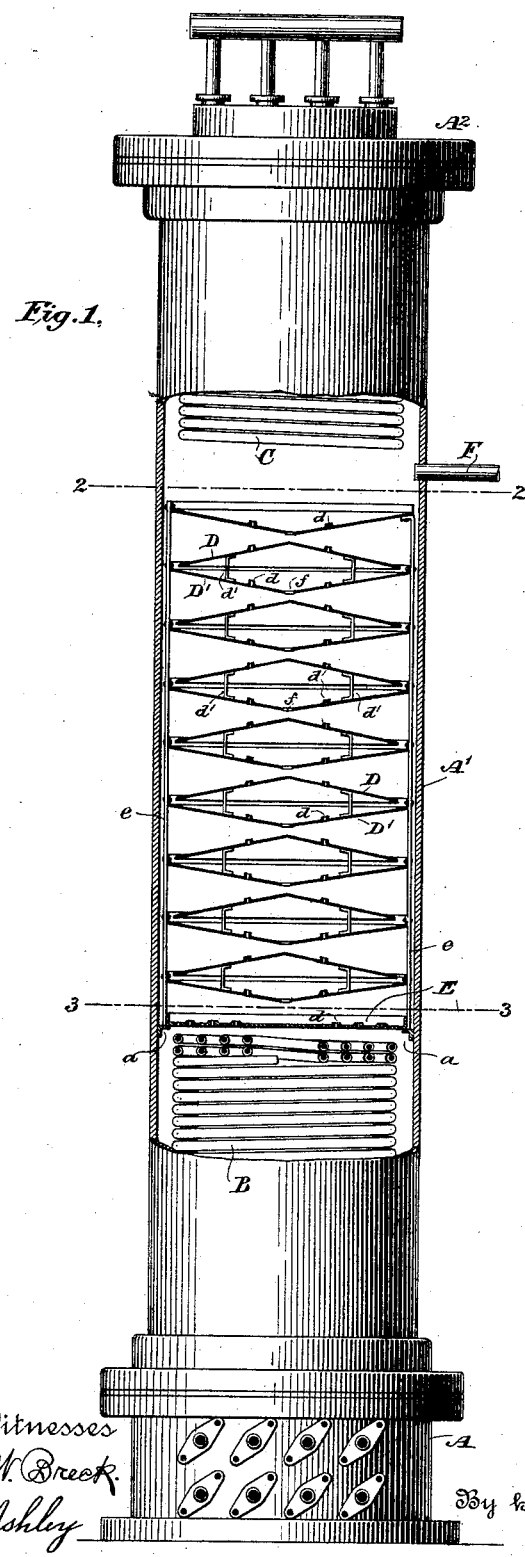
Figure 2:
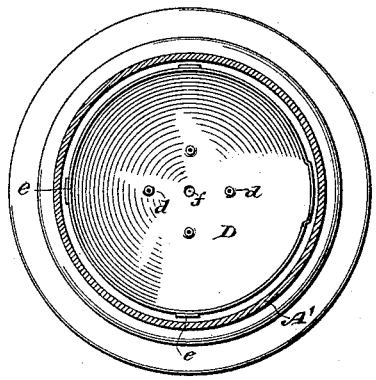

In the accompanying drawings, which represent so much of my improved apparatus as is necessary to illustrate the invention herein claimed, Figure 1 represents a view in elevation with the central portion of the casing removed to show the interior more clearly; Fig. 2, the horizontal section thereof on the line 2 2 of Fig. 1, and Fig. 3 a similar section on the line 3 3 of the above-mentioned figure.

Unless otherwise stated, the construction of the apparatus may be substantially similar to that shown in Letters Patent above mentioned.

The still is shown as consisting of a base A, a shell or casing A', detachably connected therewith, and a removable cover A².

The lower portion of the still is occupied by steam-coils B, the upper portion by condensing-coils C, so connected with the cover as to be removable therewith.

The combined ammonia and gas or strong ammonia enters the still through the pipe F near the upper part of the still and falls upon a series of basins and deflectors D D', with the exception of the upper one arranged in pairs one over the other, with their convex faces outward, so as to appear substantially lozenge or diamond shaped in cross-section. Each set of basins and deflectors is connected by internal braces $d'$ and provided with perforated nipples $d$. The deflectors and basins are arranged in pairs parallel with each other, the edge of the upper one lying within that of the lower one and being of smaller diameter, so as to leave an annular passage between them. The basins are secured at their edges to a cage consisting of vertical rods $e$, secured at top to the upper deflectors and at the bottom to a flanged disk or diaphragm E, also provided with perforated nipples. The upper basin is made, preferably, dish-shaped or concave on top and with a central perforation in addition to the nipples above mentioned, and each lower basin is similarly perforated.

Figure 3:
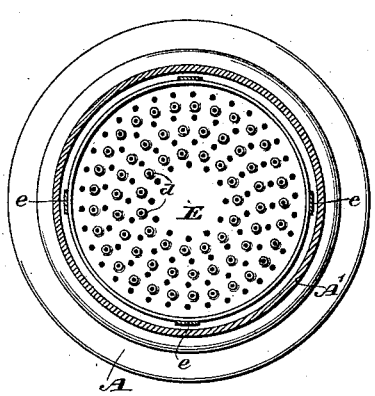

Fig. 3 shows the perforations in the bottom of the diaphragm E, which, in addition to the perforated nipples, is reticulated or perforated for the descent of the fluid through it.

The cage supporting the deflectors, it will be observed, is of a diameter less than that of the interior of the still, and the diaphragm itself rests on an annular flange $a$ therein. This construction enables the cage and its appurtenances to be taken endwise from the casing when its cover and upper coils are removed. The pipe F should not be allowed to project far enough into the shell to interfere with the removal of the cage.

The operation of the apparatus will be readily understood from the foregoing description. The liquid discharged upon the upper basin D' flows downward through its central opening $f$ upon the deflector D below to the periphery thereof and returns to the center of the succeeding one, this operation being repeated at each deflector, thus exposing a large surface to evaporation. The unvolatilized liquid descends through the diaphragm upon the heating-coils B, that portion not vaporized finally escaping through a suitable pipe to the absorber. The gas rises through the nipples and around the cage and passes off through a suitable pipe to the condenser, as usual.

As the use of coils and deflectors, broadly considered, is old, I limit my claims to the specific organizations therein set forth.

Having thus fully described the organization and operation of my improved still, what I claim therein as my invention, and desire to secure by Letters Patent, is—

1. The combination, substantially as hereinbefore set forth, of the casing, the lower steam-coil, the removable head of the casing, the aqueous-vapor-condensing coils connected therewith, the inlet-pipe, and the series of removable connected perforated deflectors and basins interposed between the coils, over and through which deflectors and basins the ammonia-liquor flows and upward and through which the gas evolved escapes.

2. The combination, substantially as hereinbefore set forth, of the casing, the removable head of the casing, the aqueous-vapor-condensing coils connected therewith, the internal supporting-flange of the casing, the basins and deflectors, the perforated diaphragm, the vertical rods connecting the diaphragm, deflectors, and basins and constituting a cage of which the internal flange forms the support, whereby the deflectors and basins may readily be removed or replaced.

3. The combination, substantially as hereinbefore set forth, of the series of centrally-perforated, flanged, and dish-shaped basins, a corresponding series of reversely-arranged superposed deflectors of smaller diameter, internal braces connecting these deflectors and basins, and external connecting-rods whereby the basins and deflectors are supported parallel with each other and a slight distance apart and rendered readily removable or replaceable.

4. The improved still hereinbefore described, consisting of the combination, substantially as hereinbefore set forth, of the casing, the lower heating-coils, the detachable head, the removable upper coil connected therewith, the inlet-pipe, the internal annular flange of the casing, the series of perforated dish-shaped basins and deflectors, their internal braces, the perforated bottom diaphragm, and the series of rods connecting the peripheries of the diaphragm, basins, and deflectors, thus constituting a removable cage interposed between the steam-coils and supported by the flange.

In testimony whereof I have hereunto subscribed my name.

P. R. GRAY, JR.

Witnesses:
GEORGE HOMMEL,
L. B. TREADWELL.